(12) United States Patent
Lee

(10) Patent No.: US 12,287,210 B2
(45) Date of Patent: Apr. 29, 2025

(54) VEHICLE POSITION ESTIMATION DEVICE, VEHICLE POSITION ESTIMATION METHOD, AND COMPUTER-READABLE RECORDING MEDIUM FOR STORING COMPUTER PROGRAM PROGRAMMED TO PERFORM SAID METHOD

(71) Applicant: SK TELECOM CO., LTD., Seoul (KR)

(72) Inventor: Seongsoo Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/056,670

(22) PCT Filed: Nov. 2, 2018

(86) PCT No.: PCT/KR2018/013252
§ 371 (c)(1),
(2) Date: Nov. 18, 2020

(87) PCT Pub. No.: WO2019/225817
PCT Pub. Date: Nov. 28, 2019

(65) Prior Publication Data
US 2021/0207977 A1 Jul. 8, 2021

(30) Foreign Application Priority Data
May 25, 2018 (KR) .................. 10-2018-0059626

(51) Int. Cl.
*G01C 21/20* (2006.01)
*G01C 21/00* (2006.01)
(Continued)

(52) U.S. Cl.
CPC .......... *G01C 21/20* (2013.01); *G01C 21/3476* (2013.01); *G01C 21/3811* (2020.08);
(Continued)

(58) Field of Classification Search
CPC ............ G01C 21/3844; G01C 21/3476; G01C 21/3811; G06V 10/25; G06V 20/588
See application file for complete search history.

(56) References Cited

U.S. PATENT DOCUMENTS 9,151,626 B1 * 10/2015 Kojo .................. G01C 21/30
9,558,584 B1 * 1/2017 Lo ............................ G06T 7/50
(Continued)

FOREIGN PATENT DOCUMENTS

CN 106774335 * 1/2017 .......... G05D 1/0231
CN 107031523 A 8/2017
(Continued)

OTHER PUBLICATIONS

CN-106774335-B text (Year: 2013).*
(Continued)

*Primary Examiner* — Joan T Goodbody
(74) *Attorney, Agent, or Firm* — WTA Patents

(57) ABSTRACT

In accordance with an aspect of the present disclosure, there is provided a vehicle position estimation method. The method comprises, obtaining a landmark-based initial position information of a camera by matching a landmark in a high definition map corresponding to a GPS-based initial position information of a vehicle to an image obtained by the camera of the vehicle, and obtaining estimated position information of the vehicle by comparing the image with a landmark in the high definition map corresponding to each of a plurality of candidate position information sampled based on the landmark-based initial position information of the camera.

16 Claims, 13 Drawing Sheets

(51) Int. Cl.
  *G01C 21/34* (2006.01)
  *G06V 10/147* (2022.01)
  *G06V 20/56* (2022.01)
  *G06V 20/58* (2022.01)

(52) U.S. Cl.
  CPC ....... *G01C 21/3844* (2020.08); *G06V 10/147* (2022.01); *G06V 20/582* (2022.01); *G06V 20/588* (2022.01)

(56) References Cited

U.S. PATENT DOCUMENTS

| | | | | |
|---|---|---|---|---|
| 2006/0146136 | A1* | 7/2006 | Cho | G01S 19/40 348/207.1 |
| 2015/0332100 | A1* | 11/2015 | Yamaguchi | G06V 20/588 348/142 |
| 2017/0010121 | A1* | 1/2017 | Shashua | G05D 1/0212 |
| 2017/0010124 | A1* | 1/2017 | Reisman | G01C 21/14 |
| 2018/0292201 | A1* | 10/2018 | Sakano | H04N 5/232 |
| 2019/0033082 | A1* | 1/2019 | Asai | G05D 1/0246 |
| 2020/0279380 | A1* | 9/2020 | Kaneko | G06T 7/73 |
| 2020/0302662 | A1* | 9/2020 | Homayounfar | G06V 10/803 |
| 2020/0341470 | A1* | 10/2020 | Maeda | G01C 21/30 |

FOREIGN PATENT DOCUMENTS

| | | | | |
|---|---|---|---|---|
| JP | 2014034251 | * | 2/2014 | ............ B60R 21/00 |
| KR | 10-2008-0029080 A | | 4/2008 | |
| KR | 10-2012-0112293 A | | 10/2012 | |

OTHER PUBLICATIONS

JP2014034251 updated translation (Year: 2014).*
Sebastiano Chiodini, et al. Visual odometry system performance for different landmark average distances, 2016 IEEE Metrology for Aerospace (MetroAeroSpace) (2016, pp. 382-387) (Year: 2016).*
JP2014034251 Patenscope translation (Year: 2014).*
PCT International Search Report and Written Opinion, PCT Application No. PCT/KR2018/013252, Feb. 20, 2019, 12 pages (with English translation of PCT International Search Report).
Office Action in Chinese Application No. 201880093798.5 dated Nov. 16, 2023.

* cited by examiner

VEHICLE POSITION ESTIMATION DEVICE, VEHICLE POSITION ESTIMATION METHOD, AND COMPUTER-READABLE RECORDING MEDIUM FOR STORING COMPUTER PROGRAM PROGRAMMED TO PERFORM SAID METHOD

CROSS-REFERENCE TO RELATED APPLICATION

This application claims priority to Korean Patent Application No. 10-2018-0059626, filed on May 25, 2018. The entire contents of the application on which the priority is based are incorporated herein by reference.

TECHNICAL FIELD

The present disclosure relates to a vehicle position estimation device, a vehicle position estimation method, and a computer-readable recording medium for storing a computer program programmed to perform the vehicle position estimation method.

BACKGROUND

In general, a vehicle means a transportation machine driving roads or tracks using fossil fuel, electricity, and the like as a power source.

The vehicle has been developed to provide various functions to a driver according to development of technology. Particularly, according to the trend of vehicle electrification, a vehicle with an Active Safety System (ASS) that operates to prevent an accident immediately before or at the time of the accident has appeared.

Further, in recent years, to alleviate burdens on the driver and enhance convenience, researches into a vehicle with an Advanced Driver Assistance System (ADAS) that actively provides information on a driving environment, such as a condition of a vehicle, a condition of the driver, and a surrounding environment, and the like are being actively conducted.

Since the ADAS operates according to the driving environment determined by a position of the vehicle, it is necessary to accurately estimate a position of the vehicle in advance. In the related art, a method of estimating a position of a vehicle using a satellite signal has been widely used, but recently, studies on a method of considering various information together to increase accuracy are actively underway.

SUMMARY

The present disclosure provides a technology that estimates a position of a vehicle more accurately than conventional technologies.

Further, the present disclosure provides a technology that more accurately determines the position of the vehicle even in a driving environment where a system such as a Global Position System (GPS) is difficult to operate properly by buildings, or of a complex city or the like.

Furthermore, the present disclosure is to apply the proposed technology to various means of transportation, for example, a vehicle adopting the ADAS.

However, the present disclosure is not limited to those mentioned above, and another disclosure, not mentioned above, may be clearly understood by those skilled in the art from the following description.

In accordance with an aspect of the present disclosure, there is provided a vehicle position estimation method comprising, obtaining a landmark-based initial position information of a camera by matching a landmark in a high definition map corresponding to a GPS-based initial position information of a vehicle to an image obtained by the camera of the vehicle, and obtaining estimated position information of the vehicle by comparing the image with a landmark in the high definition map corresponding to each of a plurality of candidate position information sampled based on the landmark-based initial position information of the camera.

In accordance with another aspect of the present disclosure, there is provided a non-transitory computer-readable recording medium including computer executable instructions, wherein the instructions, when executed by a processor, cause the processor to perform a vehicle position estimation method. The method comprises, obtaining a landmark-based initial position information of a camera by matching a landmark in a high definition map corresponding to a GPS-based initial position information of a vehicle to an image obtained by the camera of the vehicle, and obtaining estimated position information of the vehicle by comparing the image with a landmark in the high definition map corresponding to each of a plurality of candidate position information sampled based on the landmark-based initial position information of the camera.

In accordance with still another aspect of the present disclosure, there is provided a vehicle position estimation device comprising, a camera initial position information acquisition unit configured to obtain a landmark-based initial position information of a camera by matching a landmark in a high definition map corresponding to a GPS-based initial position information of a vehicle to an image obtained by the camera of the vehicle, a camera estimated position information acquisition unit configured to obtain estimated position information of the camera by comparing the image with a landmark in the high definition map corresponding to each of a plurality of candidate position information sampled based on the landmark-based initial position information of the camera, and a vehicle estimated position information acquisition unit configured to obtain the estimated position information of the vehicle based on the estimated position information of the camera.

A vehicle position estimation device, a vehicle position estimation method, and a computer-readable recording medium for storing a computer program programmed to perform the vehicle position estimation method according to one embodiment may estimate more accurate position of the vehicle by using an image obtained by a camera of the vehicle and a high definition map as well as a satellite signal.

In addition, since it is possible to estimate the position of the vehicle without an expensive device such as LiDar, cost may be reduced in manufacturing the device.

DETAILED DESCRIPTION

The advantages and features of the present disclosure and the methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the present disclosure are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1A:
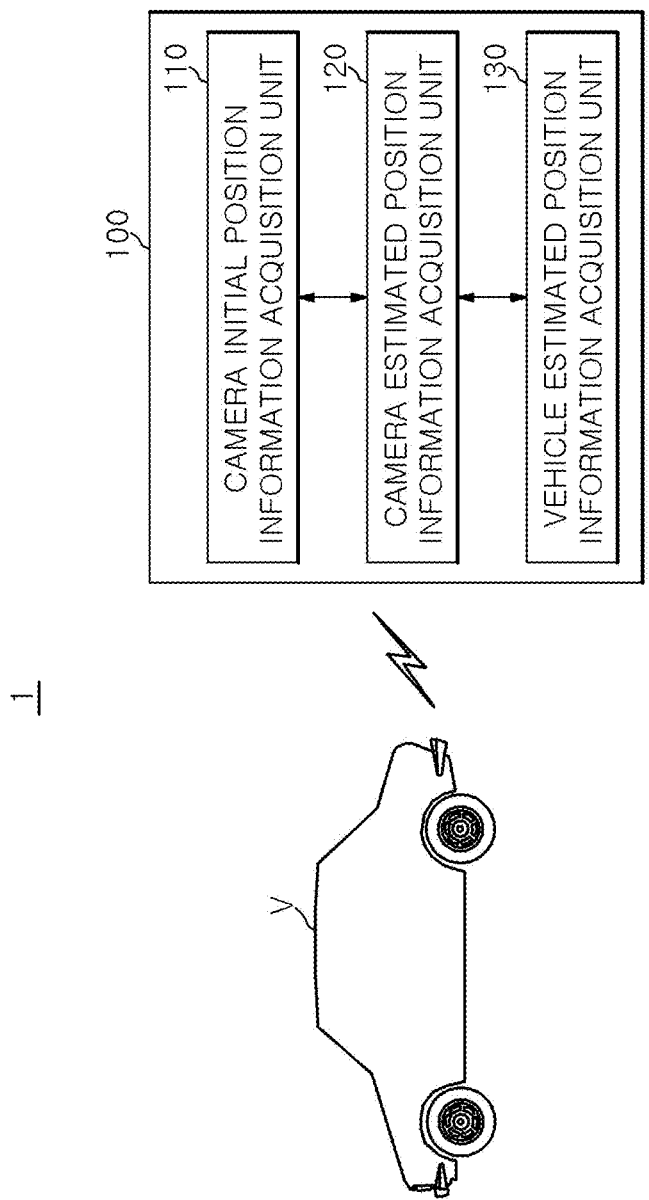
FIG. 1A shows a control block diagram of a vehicle position estimation system according to various embodiments.
Figure 1B:
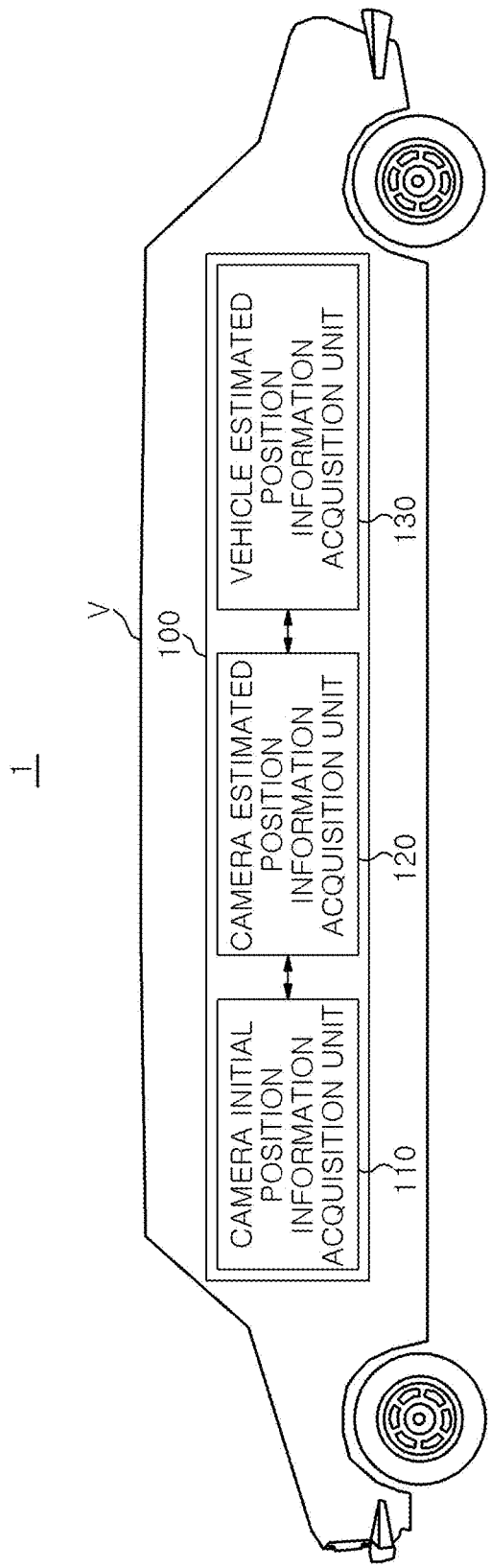
FIG. 1B shows a control block diagram of a vehicle position estimation system according to various embodiments.
Figure 2:
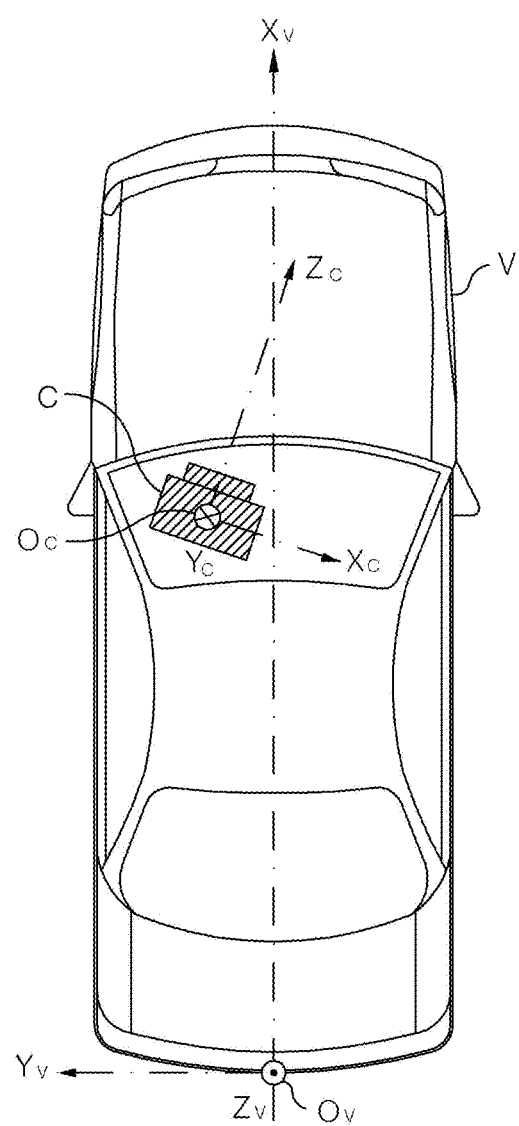
FIG. 2 shows a diagram illustrating a vehicle coordinate system and a camera coordinate system according to one embodiment.

FIGS. 1A and 1B show control block diagrams of a vehicle position estimation system 1 according to various embodiments, and FIG. 2 shows a diagram illustrating a vehicle coordinate system and a camera coordinate system according to one embodiment.

Referring to FIG. 1A, the vehicle position estimation system 1 according to one embodiment may include a vehicle V and a vehicle position estimation device 100.

The vehicle V may indicate a transportation means capable of moving humans, objects, or animals from one location to another location while running along a road or a track. The vehicle V according to one embodiment may include a vehicle with three wheels or a vehicle with four wheels, a vehicle with two wheels such as a motorcycle, a construction machine, a motor bicycle, a bicycle, and a train running on the track, and the like.

The vehicle V of FIG. 1A may include a Global Position System (GPS) module, and thus may receive a satellite signal including navigation data from at least one GPS satellite. The vehicle V may obtain a GPS-based current location of the vehicle V and a traveling direction of the vehicle V based on the satellite signal.

Further, the vehicle V of FIG. 1A may store a high definition map in advance. Herein, the high definition map may indicate a map that has high accuracy for safe and precise control over the vehicle V, and include information on an altitude, slope, curvature, and the like, as well as a plane (2-dimensional) position of the road. In addition, the high definition map may further include information on road facilities such as traffic lanes, road signs, traffic lights, a guardrail, and the like.

In addition, the vehicle V of FIG. 1A may include an Advanced Driver Assistance System (ADAS). Herein, the ADAS may indicate a system that provides information on a driving environment such as condition of the vehicle V, condition of a driver, and surrounding environment information or actively controls the vehicle V to reduce a burden on the driver and enhance convenience.

The ADAS included in the vehicle V may include a sensing device for detecting the driving environment of the vehicle V. The sensing device according to one embodiment may include radar that detects the driving environment by emitting a pulse around the vehicle V and receiving an echo pulse reflected from an object positioned in a corresponding direction, LiDAR that emits a laser around the vehicle V and receives an echo laser reflected from an object positioned in a corresponding direction, and/or an ultrasonic sensor that emits an ultrasonic wave around the vehicle V and receives an echo ultrasonic wave reflected from an object positioned in a corresponding direction, and the like.

In addition, the ADAS may include a camera C as the sensing device. The camera C may be provided to face forward, sideways, and/or rearward from the vehicle V, and thus may capture an image in a corresponding direction. The captured image may be a basis for obtaining information such as the traffic lane or the road sign, as well as an object around the vehicle V through image processing.

On the other hand, the vehicle V may combine, to control the vehicle V, image information obtained by the camera C and Controller Area Network (CAN) DATA such as wheel rotation information and yaw rate information transmitted through a CAN communication method, which is a communication method between internal modules of the vehicle V. At this time, while the image obtained by the camera C may follow the camera coordinate system, the CAN DATA may follow the vehicle coordinate system.

FIG. 2 shows a rough floor plan of the vehicle V according to one embodiment illustrating the coordinate system of the vehicle V and the coordinate system of the camera C included in the vehicle V. Referring to FIG. 2, the vehicle V may have the vehicle coordinate system including an $O_V$ as an origin, an $X_V$ axis in the traveling direction of the vehicle V, a $Z_V$ axis in a vertical direction from ground, and an $Y_V$ axis perpendicular to the $X_V$ axis and the $Z_V$ axis. On the other hand, the camera C included in the vehicle V may have the camera coordinate system including an $O_C$ as an origin, and an $X_C$ axis, an $Y_C$ axis, and a $Z_C$ axis, which are determined according to an installation position and an attitude angle. In order to combine two pieces of information each on a different coordinate system, unification of the coordinate systems, which is called camera calibration, may be performed.

To this end, the camera calibration may be performed before the vehicle V is driven. Specifically, a recognition pattern image for correction may be obtained by using the camera C included in the vehicle V, and the attitude angle and the position at which the camera C is installed may be obtained by using the obtained recognition pattern image. As another example, a traffic lane may be recognized through the camera C during traveling of the vehicle V, and the attitude angle of the camera C may be obtained by identifying a position of a vanishing point based on the recognized traffic lane.

Alternatively, the vehicle position estimation device 100 of the vehicle position estimation system 1 may perform the camera calibration in real time. This will be described later.

Referring to FIG. 1A again, the vehicle position estimation device 100 according to one embodiment may estimate position information of the vehicle V by using information received from the vehicle V. Herein, the position information may include a position and an attitude angle.

In order to obtain the position information, the vehicle position estimation device 100 may exchange information by communicating with the vehicle V in various publicly known communication methods. The vehicle position estimation device 100 according to one embodiment may communicate with the vehicle V through a base station by adopting a publicly known communication method such as CDMA, GSM, W-CDMA, TD-SCDMA, WiBro, LTE, EPC, and the like. Alternatively, the vehicle position estimation device 100 according to another embodiment may communicate with the vehicle V within a predetermined distance by adopting a communication method such as a wireless LAN, Wi-Fi, Bluetooth, Zigbee, Wi-Fi Direct (WFD), Ultra-Wide Band (UWB), Infrared Data Association (IrDA), Bluetooth Low Energy (BLE), and Near Field Communication (NFC), and the like. However, the method in which a communication unit communicates with the vehicle V is not limited to the embodiments described above.

The vehicle position estimation device 100 may obtain landmark-based initial position information of the camera C based on the information received from the vehicle V, may obtain estimated position information of the camera C by matching a landmark corresponding to the obtained landmark-based initial position information of the camera C to the image captured by the camera C, and may obtain estimated position information of the vehicle V based on the obtained estimated position information of the camera C.

To this end, the vehicle position estimation device 100 may include a camera initial position information acquisition unit 110 for obtaining the landmark-based initial position information of the camera C included in the vehicle V, a camera estimated position information acquisition unit 120 for obtaining the estimated position information of the camera C, and a vehicle estimated position information acquisition unit 130 for obtaining the estimated position information of the vehicle V.

On the other hand, FIG. 1A illustrates a case in which the vehicle position estimation device 100 included in the vehicle position estimation system 1 is provided separately from the vehicle V, however, alternatively, the vehicle position estimation device 100 may be provided inside the vehicle V.

Referring to FIG. 1B, the vehicle position estimation system 1 according to another embodiment may include a vehicle V including the vehicle position estimation device 100. However, except for a way in which the vehicle position estimation device 100 is provided, the operations of the vehicle position estimation system 1 of FIG. 1A and the vehicle position estimation system 1 of FIG. 1B are the same.

Hereinafter, referring to FIGS. 3 through 12, each component of the vehicle position estimation device 100 will be described in detail.

The vehicle position estimation device 100 according to one embodiment may estimate position information of the vehicle V by matching an image captured by the camera C with a landmark in a high definition map. Accurate position information of the camera C may be required for the matching of the image with the high definition map, and since the coordinate system of the vehicle V and the coordinate system of the camera C may be set differently as described above, conversion of the coordinate system may be required. In addition, since GPS-based initial position information of the vehicle V may be inaccurate in an area where high-rise buildings are densely concentrated, camera calibration may be performed before estimating a position of the vehicle V.

The camera initial position information acquisition unit 110 may perform the camera calibration by using the GPS-based initial position information of the vehicle V. Hereinafter, referring to FIGS. 3 through 5, operations of the camera initial position information acquisition unit 110 will be described in detail.

Figure 3:
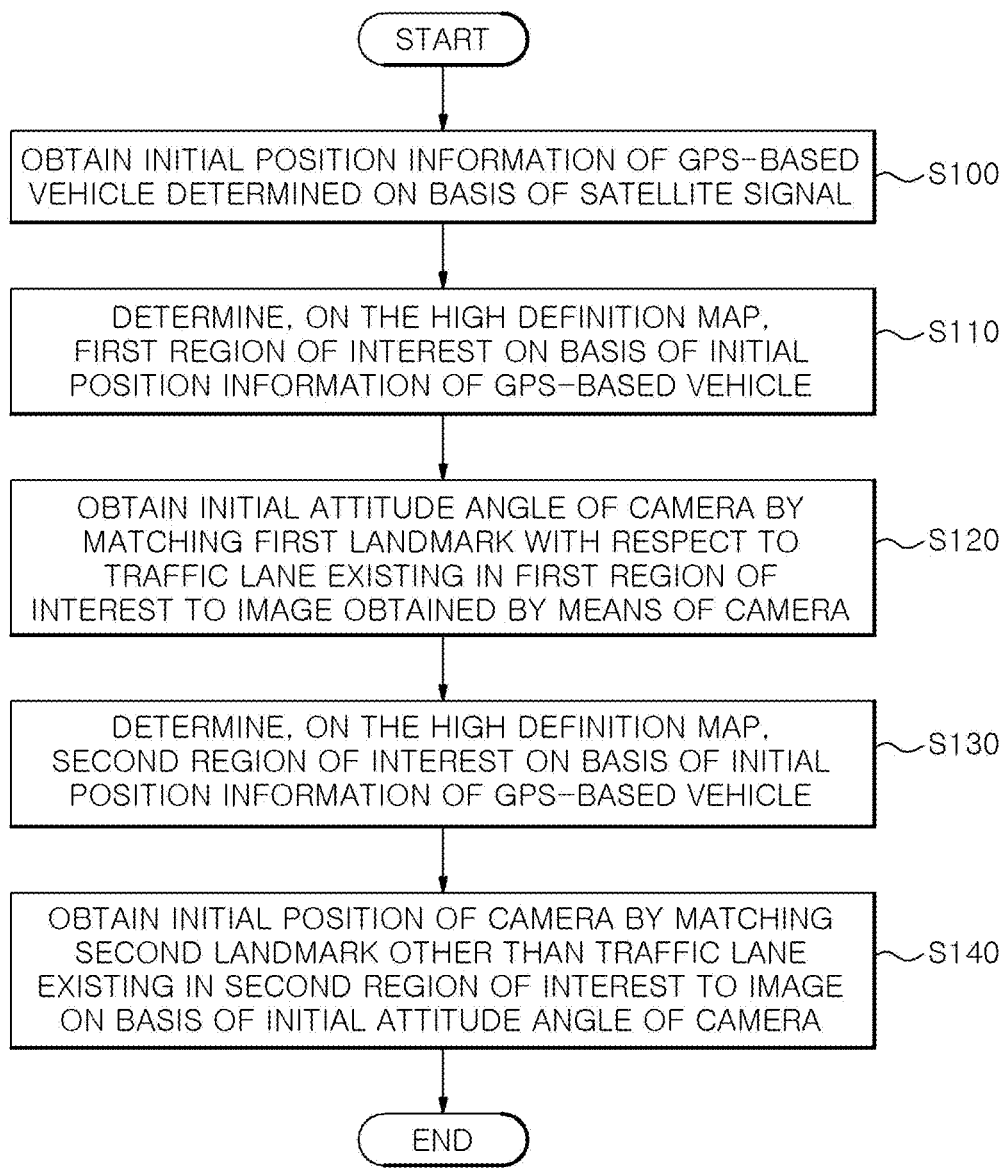
FIG. 3 shows a flowchart illustrating a method of obtaining landmark-based initial position information of a camera by a camera initial position information acquisition unit according to one embodiment.
Figure 4:
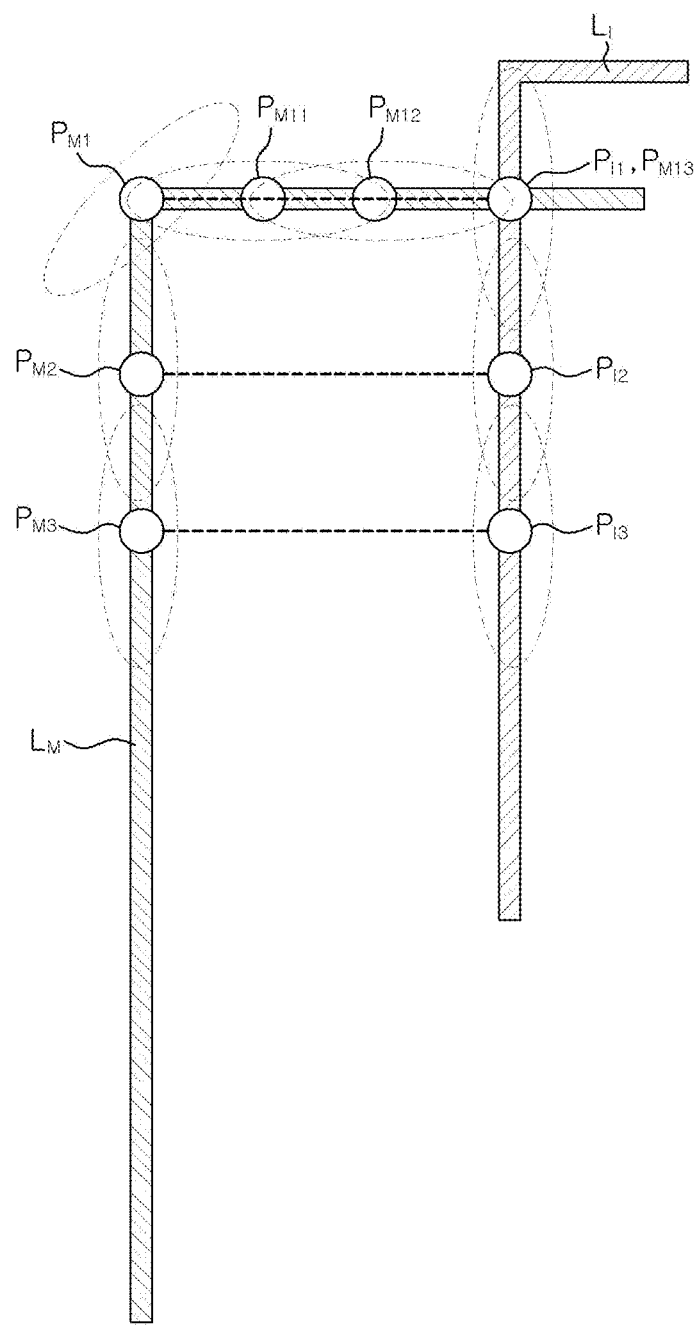
FIG. 4 shows a diagram illustrating a landmark matching method according to one embodiment.
Figure 5:
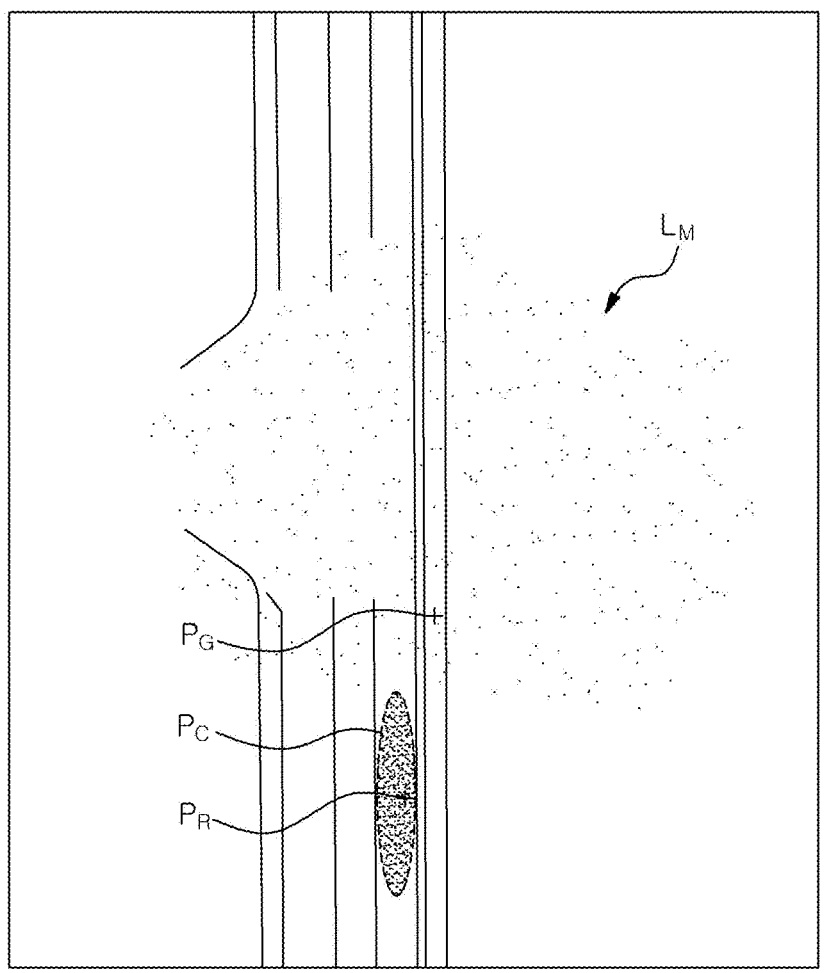
FIG. 5 shows a diagram illustrating a result according to the method of obtaining the landmark-based initial position information of the camera illustrated in FIG. 3.

FIG. 3 shows a flowchart illustrating a method of obtaining landmark-based initial position information of the camera C by the camera initial position information acquisition unit 110 according to one embodiment, FIG. 4 shows a diagram illustrating a landmark matching method according to one embodiment, and FIG. 5 shows a diagram illustrating a result according to the method of obtaining the landmark-based initial position information of the camera illustrated in FIG. 3.

Referring to FIG. 3, in a step S100, the camera initial position information acquisition unit 110 may obtain GPS-based initial position information of the vehicle determined on basis of a satellite signal. The camera initial position information acquisition unit 110 according to one embodiment may receive, from the vehicle V, the GPS-based initial position information including a GPS-based initial position and an initial attitude angle of the vehicle V. Alternatively, the camera initial position information acquisition unit 110 according to another embodiment may receive, from the vehicle V, the GPS-based initial position of the vehicle V, and may obtain the GPS-based initial position information including the initial attitude angle of the vehicle V by using the GPS-based initial position.

When only the GPS-based initial position of the vehicle V is received from the vehicle V, the camera initial position information acquisition unit 110 may obtain the initial attitude angle of the vehicle V by using the GPS-based initial position of the vehicle V. Specifically, the camera initial position information acquisition unit 110 may obtain an $X_V$ axis indicating a traveling direction of the vehicle V based on the GPS-based initial positions of the vehicle V which are received in series, and an $Z_V$ axis in a vertical direction from ground which is determined by a traffic lane on a high definition map, and then may obtain an $Y_V$ axis by performing a cross product of the $X_V$ axis and the $Z_V$ axis. Further, considering a possibility that the $X_V$ axis and the $Y_V$ axis previously obtained may not be perpendicular to each other because of an error inherent in the satellite signal, the camera initial position information acquisition unit 110 may correct the $X_V$ axis by performing a cross product of the $Y_V$ axis and the $Z_V$ axis.

Through those described above, the camera initial position information acquisition unit 110 may obtain three-dimensional coordinate values that are an landmark-based initial position of the camera C and a three-dimensional coordinate axis that is the initial attitude angle of the camera C.

Then, in a step S110, the camera initial position information acquisition unit 110 may determine, on the high definition map, a first region of interest on basis of the GPS-based initial position information of the vehicle V. Specifically, the camera initial position information acquisition unit 110 may determine an area within a first radius of the vehicle V as the first region of interest based on the GPS-based initial position information of the vehicle V. For example, the first radius may be several meters or less.

When the first region of interest is determined, in a step S120, the camera initial position information acquisition unit 110 may obtain the initial attitude angle of the camera C by matching a first landmark with respect to the traffic lane existing in the first region of interest to an image obtained by means of the camera C. Specifically, the camera initial position information acquisition unit 110 may obtain a rotation matrix R for the initial attitude angle of the camera C according to Equation 1.

$$S^* = \underset{T}{\mathrm{argmin}} \sum \{Z_k - h(T, R, P_k)\}^T (C_{Z_k} - HC_{P_k}H^T)^{-1}\{Z_k - h(T, R, P_k)\}$$

[Equation 1]

Herein, a solution S* of Equation 1 may indicate the initial position information including the rotation matrix R for the initial attitude angle of the camera C and a translation matrix T for the landmark-based initial position of the camera C. $Z_k$ may indicate coordinate values of the traffic lane detected from the image, $P_k$ may indicate coordinate values of a landmark in the high definition map corresponding to $Z_k$, and $C_{Zk}$ and $C_{Pk}$ may each indicate covariance representing an error for $Z_k$ and $P_k$, and H may be a Jacobian matrix indicating a partial derivative of a function h( ). In addition, the function h( ) may indicate a function projecting the coordinate values of the landmark in the high definition map onto the image, which may be defined according to Equation 2.

$$h(T,R,P) = J(R \times P + T)$$

[Equation 2]

Herein, T may indicate the translation matrix for the landmark-based initial position of the camera C, R may indicate the rotation matrix for the initial attitude angle of the camera C, and P may indicate coordinate values of the landmark in the high definition map. K may indicate an intrinsic parameter matrix of the camera C for projecting coordinate values based on the camera coordinate system into the image captured by the camera C.

To obtain the solution S* of Equation 1, the camera initial position information acquisition unit 110 may select at least one of publicly known algorithms, for example, a Gauss Newton algorithm or a Levenberg-Marquardt algorithm.

FIG. 4 shows a diagram illustrating a Point Cloud Set $L_I$ including feature points $P_{I1}$, $P_{I2}$, and $P_{I3}$ and a Point Cloud Set $L_M$ including feature points $P_{M1}$, $P_{M2}$, $P_{M3}$, $P_{M11}$, $P_{M12}$, and $P_{M13}$ on a two-dimensional space. An area with a dashed line may indicate covariance of an internal feature point.

Referring to FIG. 4, covariance regarding a feature point of a Point Cloud Set of a landmark extending in one direction such as a traffic lane may be an elliptical shape formed in the extending direction. Accordingly, the camera initial position information acquisition unit 110 may match the first landmark to the image by repeatedly calculating the solution of Equation 1 by using the feature points closest to each other as a corresponding relationship. Feature points connected by bold broken lines in FIG. 4 may represent a mutual corresponding relationship.

When Equation 1 is calculated to match the first landmark of the traffic lane extending in one direction to the image, an error may be large in a longitudinal direction in which the traffic lane extends, whereas an error may be small in a lateral direction. As a result, the rotation matrix R for the initial attitude angle of the camera C may have reliable accuracy.

On the other hand, the translation matrix T for the landmark-based initial position of the camera C may be inaccurate compared to the rotation matrix R. Therefore, the camera initial position information acquisition unit 110 may obtain the translation matrix T for the landmark-based initial position of the camera C by matching a second landmark other than the traffic lane to the image. Specifically, in a step S130, the camera initial position information acquisition unit 110 may determine, on the high definition map, a second region of interest on basis of the GPS-based initial position information of the vehicle V. Specifically, the camera initial position information acquisition unit 110 may determine an area within a second radius which is equal to or greater than the first radius as the second region of interest based on the GPS-based initial position information of the vehicle V. In order to accurately obtain the landmark-based initial position of the camera C by using the landmark within a wider range, the initial attitude angle may be obtained among the landmark-based initial position information of the camera C. Herein, the second radius may be several hundred meters or less.

Next, in a step S140, the camera initial position information acquisition unit 110 may obtain the landmark-based initial position of the camera C by matching the second landmark other than the traffic lane existing in the second region of interest to the image on basis of the initial attitude angle of the camera C. Specifically, the camera initial position information acquisition unit 110 may obtain the translation matrix T for the landmark-based initial position of the camera C by inputting the previously obtained rotation matrix R for the initial attitude angle of the camera C to Equation 1 to calculate.

At this time, the translation matrix T for a plurality of landmark-based initial positions of the camera C corresponding to the rotation matrix R for the initial attitude angle of the camera C may be obtained.

The landmark-based initial position information including the obtained landmark-based initial position and the initial attitude angle of the camera C may be used as an input value for estimating position information of the camera C, which will be described later.

Compared to a case of estimating the position information of the camera C by simply using the GPS-based initial position information of the vehicle V as the position information of the camera C, it is possible to improve accuracy and processing speed of estimating the position information of the camera C since the more accurate landmark-based initial position information of the camera C is used as an input value when the above-described method is followed.

FIG. 5 illustrates a case in which a plurality of candidate items obtained when the landmark-based initial position information of the camera C obtained through the landmark matching is used as the input value are displayed on the high definition map. Specifically, in FIG. 5, a plurality of candidate positions $P_C$ estimated according to the above-described method on the high definition map including a plurality of landmark $L_M$ are illustrated. Assuming that the GPS-based initial position of the vehicle V is $P_G$ and an actual position of the vehicle V is $P_R$. Considering the matching result, it may be seen that the candidate positions $P_C$ are closer to the actual position $P_R$ of the vehicle V than the GPS-based initial position $P_G$ of the vehicle V.

When the landmark-based initial position information of the camera C is obtained, the camera estimated position information acquisition unit 120 may obtain estimated position information of the camera C by using the landmark-based initial position of the camera C as an input value. Hereinafter, referring to FIGS. 6 through 10, a method of obtaining the estimated position information of the camera C will be described in detail.

Figure 6:
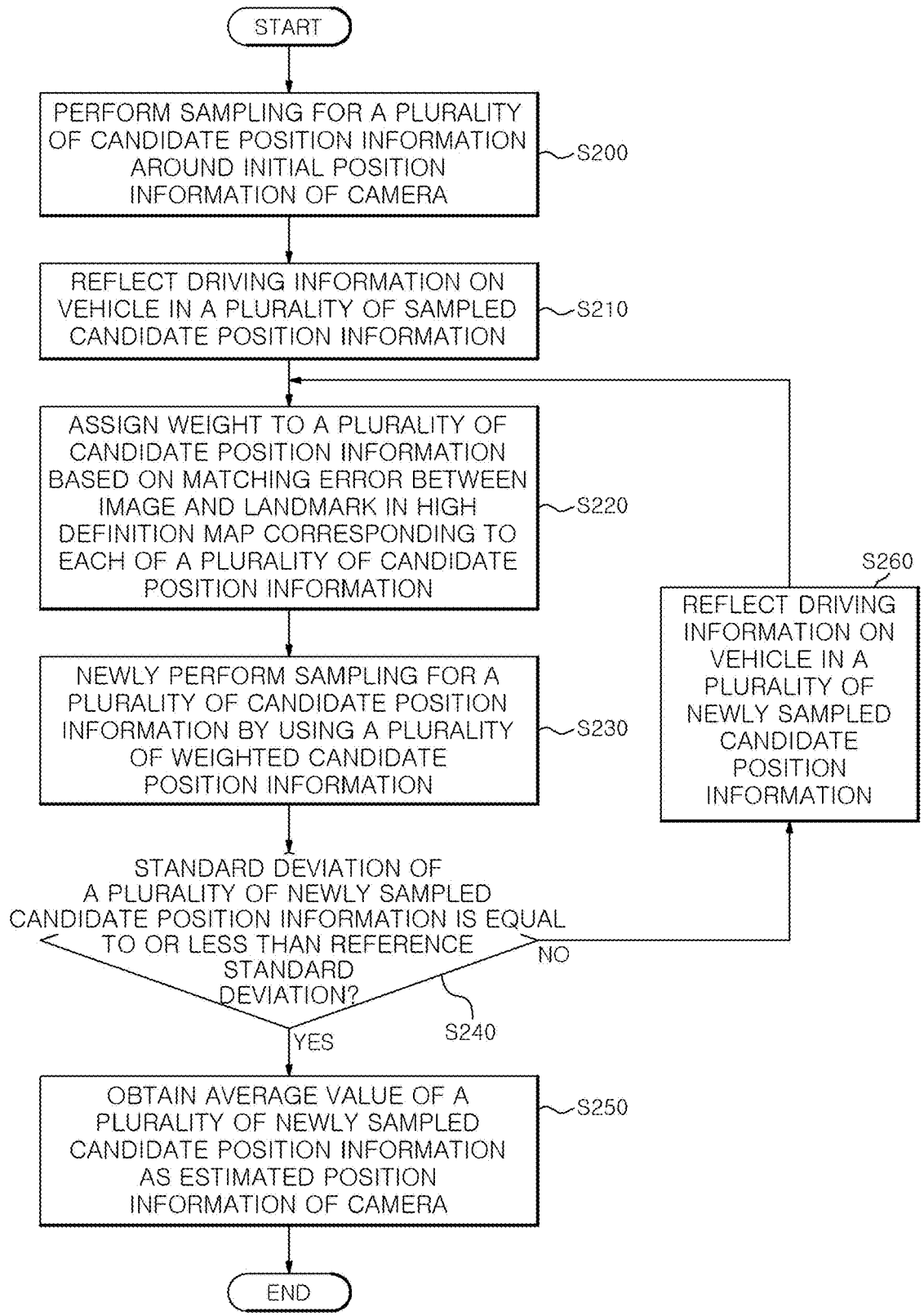
FIG. 6 shows a flowchart illustrating a method of obtaining estimated position information of a camera by a camera estimated position information acquisition unit according to one embodiment.
Figure 7:
FIG. 7 shows a diagram illustrating a result of extracting, from an image captured by a camera, a first landmark regarding a traffic lane and a second landmark other than a traffic lane according to one embodiment.
Figure 8:
FIG. 8 shows a diagram illustrating a result of matching a landmark of a high definition map to the image illustrated in FIG. 7.
Figure 9A:
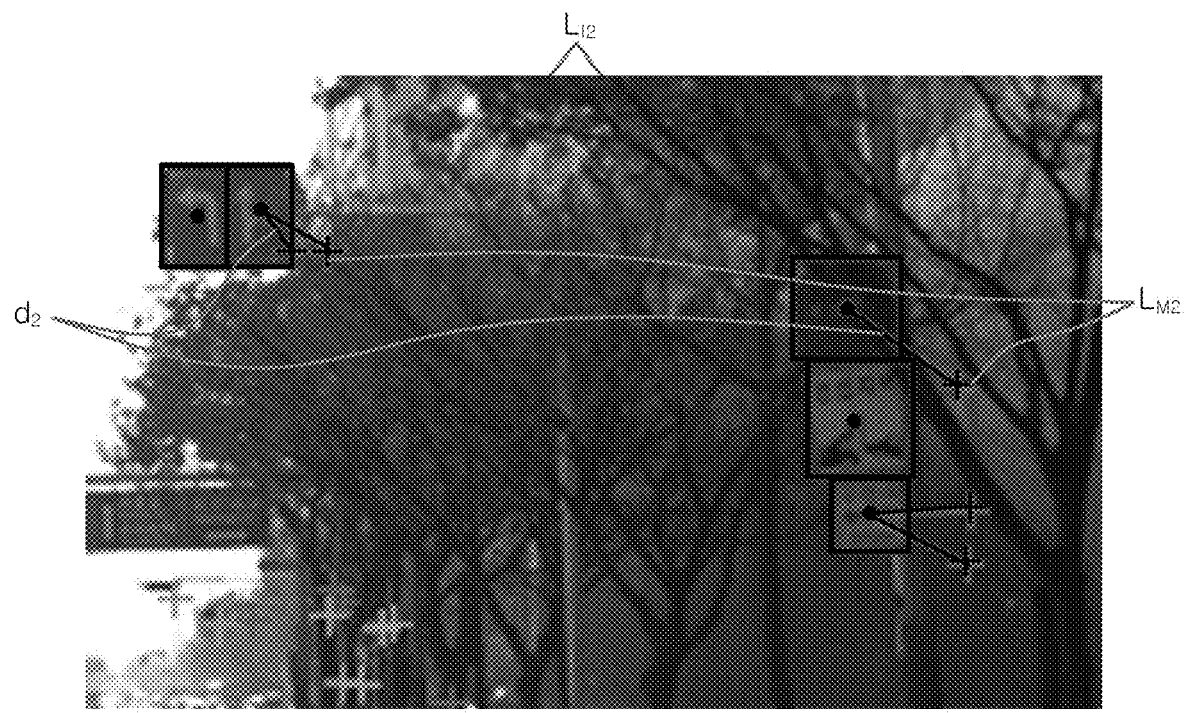
FIG. 9A shows a diagram illustrating errors according to the matching illustrated in FIG. 8.
Figure 9B:
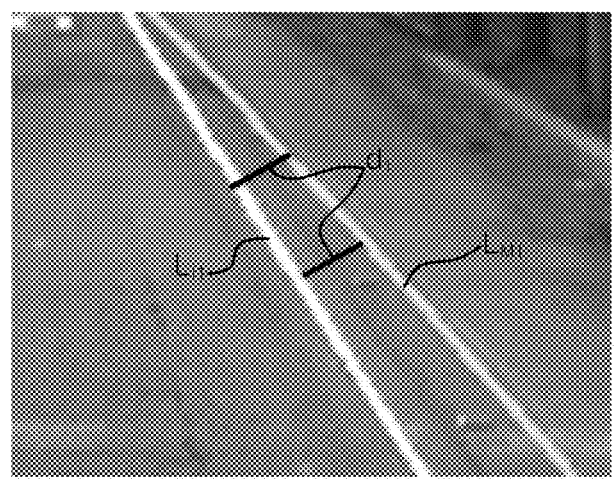
FIG. 9B shows a diagram illustrating errors according to the matching illustrated in FIG. 8.
Figure 10:
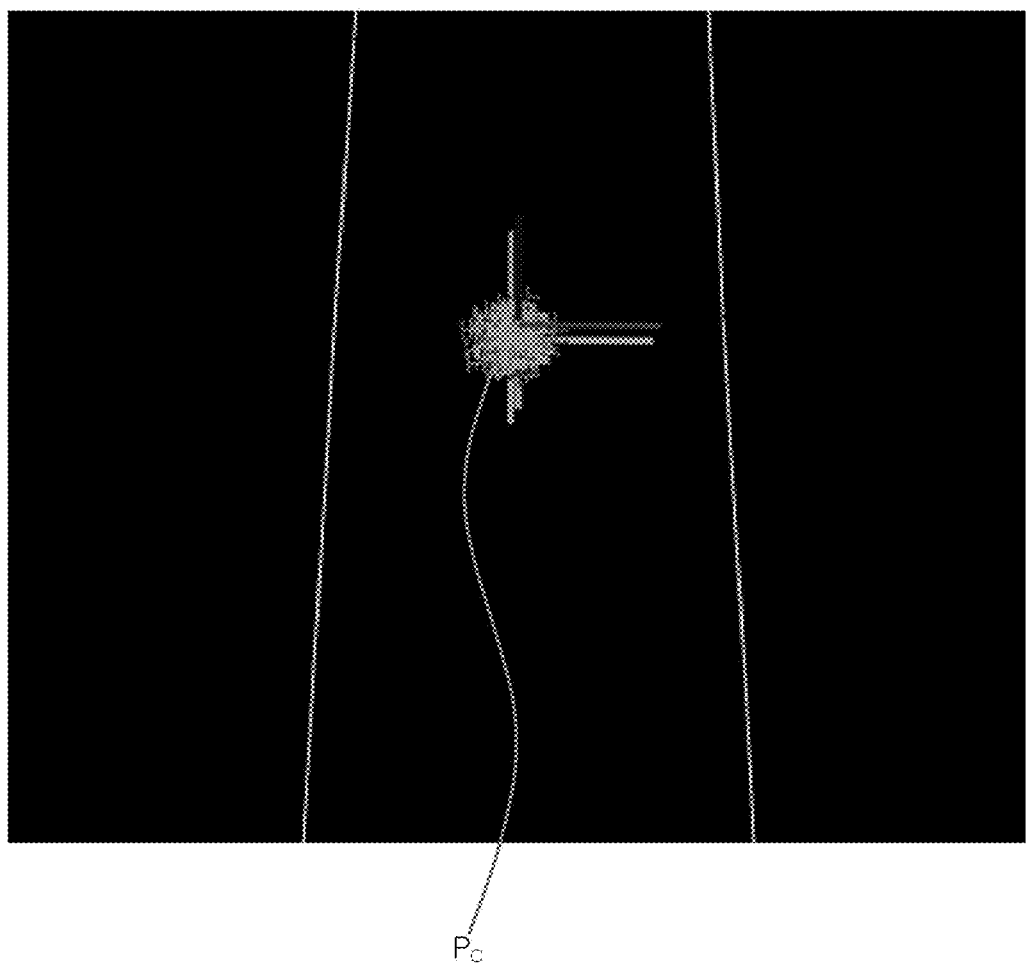
FIG. 10 shows a diagram illustrating a final result according to a method of obtaining an estimated position information of a camera according to one embodiment.

FIG. 6 shows a flowchart illustrating a method of obtaining estimated position information of the camera C by the camera estimated position information acquisition unit 120 according to one embodiment, FIG. 7 shows a diagram illustrating a result of extracting, from an image captured by the camera C, a first landmark regarding a traffic lane and a second landmark other than a traffic lane according to one embodiment, FIG. 8 shows a diagram illustrating a result of matching a landmark of a high definition map to the image illustrated in FIG. 7, FIGS. 9A and 9B show diagrams illustrating errors according to the matching illustrated in FIG. 8, and FIG. 10 shows a diagram illustrating a final result according to a method of obtaining an estimated position information of the camera C according to one embodiment.

Referring to FIG. 6, in a step S200, the camera estimated position information acquisition unit 120 may perform sampling for a plurality of candidate position information around landmark-based initial position information of the camera C. Specifically, the camera estimated position information acquisition unit 120 may set the landmark-based initial position information of the camera C as an average and perform sampling by using a Gaussian probability model in which error modeling is set with a predetermined covariance. At this time, the Gaussian probability model may be defined as a minimum of six dimensions with three degrees of freedom for the attitude angle and three degrees of freedom for a position.

If there is a plurality of the landmark-based initial position information of the camera C, the camera estimated position information acquisition unit 120 may perform sampling for each landmark-based initial position information of the camera C according to the Gaussian probability model.

Then, the camera estimated position information acquisition unit 120 may obtain the estimated position information of the camera C by using a particle filter. Specifically, in a step S210, the camera estimated position information acquisition unit 120 may reflect driving information on the vehicle V in the plurality of the candidate position information. At this time, the camera estimated position information acquisition unit 120 may follow Equation 3.

$$\begin{bmatrix} \hat{x}(k+1) \\ \hat{y}(k+1) \\ \hat{z}(k+1) \end{bmatrix} = \begin{bmatrix} \hat{x}(k) \\ \hat{y}(k) \\ \hat{z}(k) \end{bmatrix} + \begin{bmatrix} \frac{s_r + s_l}{2}\cos\left(\theta + \frac{s_r + s_l}{2b}\right) \\ \frac{s_r + s_l}{2}\sin\left(\theta + \frac{s_r + s_l}{2b}\right) \\ \frac{s_r + s_l}{2b} \end{bmatrix}$$ [Equation 3]

Herein, a matrix [x(k); y(k); θ(k)] may indicate a position and a traveling direction of the vehicle V at a time k. $S_r$ may indicate a traveling distance according to a right wheel speed of the vehicle V, and $S_l$ may indicate a traveling distance according to a left wheel speed of the vehicle V.

To this end, the camera estimated position information acquisition unit 120 may receive the driving information including wheel speed information and yaw rate information from the vehicle V.

Then, in a step S220, the camera estimated position information acquisition unit 120 may weight each of the plurality of the candidate position information based on a matching error between a landmark, on the high definition map, corresponding to each of the plurality of the candidate position information and the image.

To this end, the camera estimated position information acquisition unit 120 may use the image in which the landmark is extracted. Referring to FIG. 7, a first landmark $L_{l1}$ for a traffic lane extracted as a white line on ground from the image captured by the camera C, and a second landmark $L_{l2}$ for a road sign extracted as a black square in front of the vehicle V from the image are illustrated.

At this time, according to a result of reflection of the driving information, candidate position information off a road or candidate position information on a road in an opposite direction to the traveling direction of the vehicle V may be excluded.

When the first landmark Ln and the second landmark $L_{l2}$ are extracted from the image, the camera estimated position information acquisition unit 120 may match the landmark in the high definition map corresponding to each of the plurality of the candidate position information with the image. At this time, the camera estimated position information acquisition unit 120 may use Equation 2 for the landmark matching.

Referring to FIG. 8, it may be seen that a first landmark $L_{M1}$ for the vehicle V extracted in a linear shape on the high definition map corresponding to specific candidate position information and a second landmark $L_{M2}$ other than the traffic lane extracted in a cross shape in front of the vehicle V are matched to the image illustrated in FIG. 7. At this time, there may be an error as a result of matching each of the first landmarks $L_{l1}$ and $L_{M1}$ and each of the second landmarks $L_{l2}$ and $L_{M2}$.

Referring to FIG. 9A, as a result of matching the second landmarks $L_{l2}$ and $L_{M2}$, it may be seen that an error equal to the distance $d_2$ exists. In addition, referring to FIG. 9B, as a result of matching the first landmarks $L_{l1}$ and $L_{M1}$, it may be seen that an error equal to the distance $d_1$ exists.

When identifying the matching error, the camera estimated position information acquisition unit 120 may obtain a weight corresponding to the matching error. This may follow Equation 4.

$$G_\sigma(\Delta x, \Delta y) = \frac{1}{2\pi\sigma^2} e^{-\left(\frac{\Delta x^2 + \Delta y^2}{2\sigma^2}\right)}$$ [Equation 4]

Herein, $G_o$ may indicate the weight, ($\Delta x$, $\Delta y$) may indicate an error for x and y in the image, and $\sigma$ may indicate a standard deviation.

Then, the camera estimated position information acquisition unit 120 may reflect the matching error by assigning the corresponding weight to the candidate position information.

After assigning the weight, in a step S230, the camera estimated position information acquisition unit 120 may newly perform sampling for the plurality of the candidate position information by using the plurality of the candidate position information where the weight is assigned. Since the sampling is newly performed based on the result of assigning the weight, the plurality of the candidate position information may converge around candidate position information with a small matching error.

When the sampling is completed, in a step S240, the camera estimated position information acquisition unit 120 may identify whether the standard deviation of the plurality of the candidate position information where the sampling is newly performed is equal to or less than a reference standard deviation. Herein, the reference standard deviation may indicate a maximum standard deviation capable of obtaining the estimated position information of the camera C by using a plurality of candidate positions.

If the standard deviation of the plurality of the candidate position information newly sampled is equal to or less than the reference standard deviation, in a step S250, the camera estimated position information acquisition unit 120 may obtain an average value of the plurality of the candidate position information newly sampled as the estimated position information of the camera C.

On the other hand, if the standard deviation of the plurality of the candidate position information newly sampled is greater than the reference standard deviation, in a step S260, the camera estimated position information acquisition unit 120 may reflect the driving information on the vehicle V in the plurality of the candidate position information newly sampled, and then the step S260 may proceed to the step S220 again.

FIG. 10 illustrates, on the high definition map, a result of repeatedly performing the above-described method until the standard deviation of the plurality of the candidate position information becomes less than or equal to the reference standard deviation. By assigning a high weight to candidate position information with a small matching error, it may be seen that newly sampled candidate positions $P_C$ converge around the candidate position information with the small matching error.

When the estimated position information of the camera C is obtained, the vehicle estimated position information acquisition unit 130 may verify validity of the estimated position information of the camera C and then, obtain estimated position information of the vehicle V based on the valid estimated position information of the camera C. Hereinafter, referring to FIGS. 11 and 12, a method of obtaining the estimated position information of the vehicle V will be described in detail.

Figure 11:
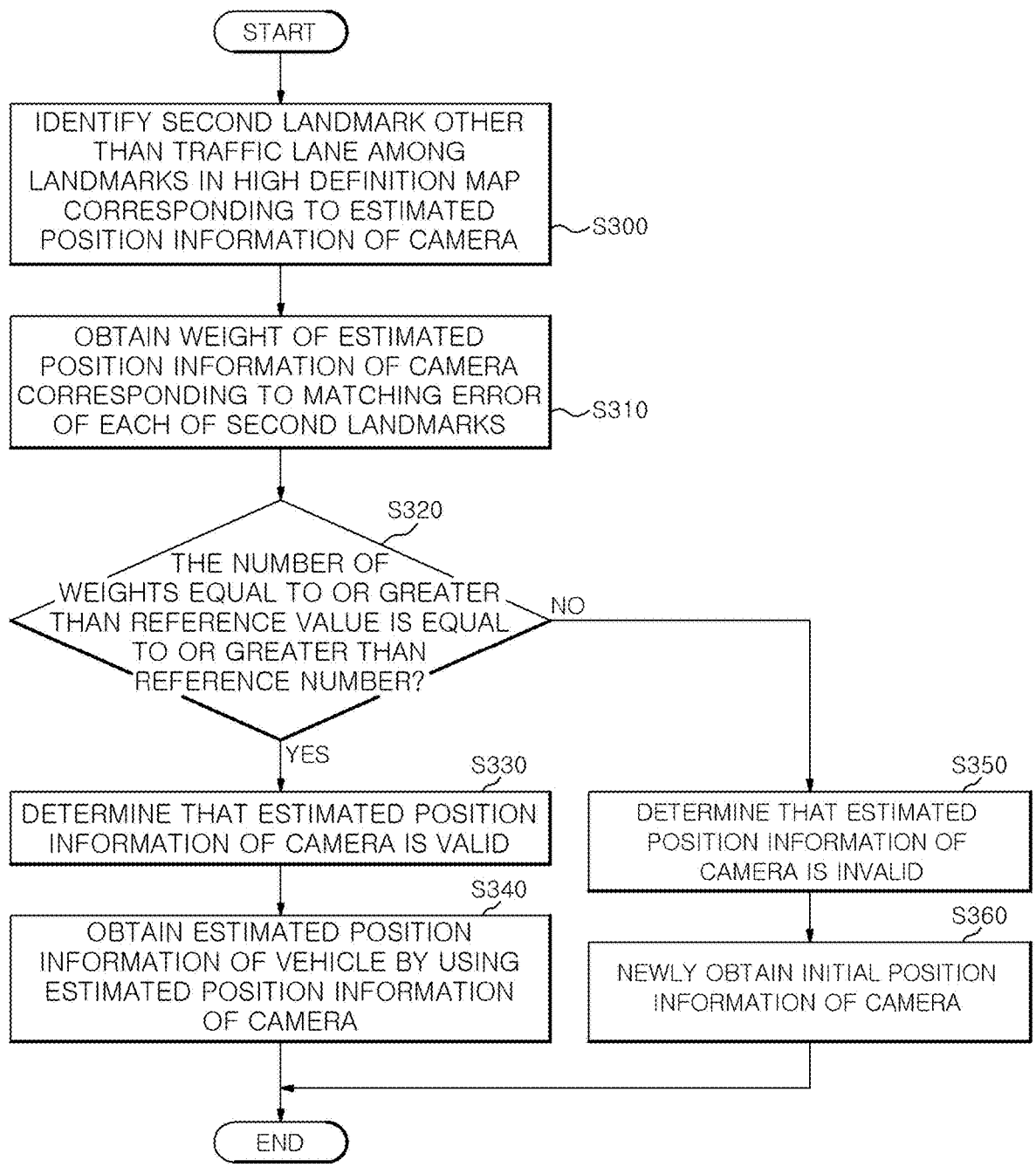
FIG. 11 shows a flowchart illustrating a method of obtaining an estimated position information of a vehicle by a vehicle estimated position information acquisition unit according to one embodiment.
Figure 12:
FIG. 12 shows a diagram illustrating a final landmark matching result according to a method of obtaining an estimated position information of a vehicle according to one embodiment.

FIG. 11 shows a flowchart illustrating a method of obtaining an estimated position information of the vehicle V by the vehicle estimated position information acquisition unit 130 according to one embodiment, and FIG. 12 shows a diagram illustrating a final landmark matching result according to the method of obtaining the estimated position information of the vehicle V according to one embodiment.

Referring to FIG. 11, in a step S300, the vehicle estimated position information acquisition unit 130 may identify a second landmark other than a traffic lane among landmarks in a high definition map corresponding to estimated position information of the camera C.

Then, in a step S310, the vehicle estimated position information acquisition unit 130 may obtain a weight of the estimated position information of the camera C corresponding to a matching error of each of the second landmarks. Herein, the weight of the estimated position information of the camera C may follow Equation 4 described above.

In a step S320, when the weight corresponding to the matching error of each of the second landmarks is obtained, the vehicle estimated position information acquisition unit 130 may identify whether the number of the weights that are equal to or greater than a reference value is equal to or greater than a reference number. Herein, the reference value may indicate a minimum weight according to a matching error where the position information of the camera C may be determined as valid, and the reference number may indicate a minimum number of weights, that are equal to or greater than the reference value, where the position information of the camera C is determined as valid.

In this case, the reference number may be determined according to the number of the identified second landmarks, and the reference number according to one embodiment may be determined at an arbitrary ratio to the number of the identified second landmarks.

If the number of the weights equal to or greater than the reference value is equal to or greater than the reference number, in a step S330, the vehicle estimated position information acquisition unit 130 may determine that the estimated position information of the camera C is valid. As a result, in a step S340, the vehicle estimated position information acquisition unit 130 may obtain the estimated position information of the vehicle V by using the estimated position information of the camera C. In this case, the vehicle estimated position information acquisition unit 130 may obtain the estimated position information of the vehicle V by using a translation matrix T and a rotation matrix R.

On the other hand, if the number of the weights equal to or greater than the reference value is less than the reference number, in a step S350, the vehicle estimated position information acquisition unit 130 may determine that the estimated position information of the camera C is invalid. As a result, in a step S360, the vehicle estimated position information acquisition unit 130 may newly obtain the landmark-based initial position information of the camera C to perform a process of obtaining the estimated position of the vehicle V again.

In FIG. 11, the validity of the estimated position information of the camera C is verified, for the single image, based on whether the number of the weights equal to or greater than the reference value is equal to or greater than the reference number. Alternatively, the vehicle estimated position information acquisition unit 130 may perform, for every frame image, the above-described verification of the validity, and compare the verification result with a predetermined reference to verify the validity of the estimated position information of the camera C. Otherwise, the vehicle estimated position information acquisition unit 130 may repeatedly perform the verification while the vehicle V is traveling a predetermined reference distance, and newly obtain landmark-based initial position information of the camera C if the estimated position information of the camera C is invalid.

In this way, the vehicle estimated position information acquisition unit 130 may monitor the estimated position information of the camera C by repeatedly performing verification of the validity based on every frame image, a predetermined period, or a predetermined traveling distance.

FIG. 12 shows a result of matching the landmark to the image based on the estimated position information of the vehicle V obtained according to FIG. 11. Since the position of the vehicle V is accurately estimated, it may be seen that the first landmarks $L_{l1}$ and $L_{M1}$ for the traffic lane and the second landmarks $L_{l2}$ and $L_{M2}$ for the road sign are accurately matched to the image.

A vehicle position estimation device, a vehicle position estimation method, and a computer-readable recording medium for storing a computer program programmed to perform the vehicle position estimation method according to the above-described embodiment may estimate more accurate position of the vehicle by using an image obtained by a camera of the vehicle and a high definition map as well as a satellite signal. In addition, since it is possible to estimate the position of the vehicle without an expensive device such as LiDar, manufacturing cost may be reduced.

On the other hand, each of the steps included in the vehicle position estimation method according to one embodiment described above may be implemented in the computer-readable recording medium for storing the computer program programmed to perform each of the steps.

According to one embodiment, the above-described vehicle position estimation device, the vehicle position estimation method, and the computer-readable recording medium for storing the computer program programmed to perform the vehicle position estimation method may be used in various fields such as a home or an industrial site, and thus have industrial applicability.

As described above, those skilled in the art will understand that the present disclosure can be implemented in other forms without changing the technical idea or essential features thereof. Therefore, it should be understood that the above-described embodiments are merely examples, and are not intended to limit the present disclosure. The scope of the present disclosure is defined by the accompanying claims rather than the detailed description, and the meaning and scope of the claims and all changes and modifications derived from the equivalents thereof should be interpreted as being included in the scope of the present disclosure.

What is claimed is:

1. A vehicle position estimation method performed by a vehicle position estimation device, the method comprising:
obtaining a GPS-based initial position of a vehicle from a satellite signal;
determining landmark-based initial position of a camera mounted on the vehicle by matching a plurality of first landmarks in a high definition map with an image captured by the camera responsive to obtaining the GPS-based initial position of the vehicle; and
determining estimated position of the vehicle by comparing the image with a plurality of second landmarks in the high definition map, each of the plurality of the second landmarks corresponding to each of a plurality of candidate positions of the camera sampled based on the landmark-based initial position of the camera, and
wherein determining the landmark-based initial position comprises:
determining an initial attitude angle of the landmark-based initial position of the camera different from an attitude angle of the vehicle by matching a coordinate of a traffic lane selected from the first landmarks in a first region of interest of the high definition map with the captured image, the first region of interest determined by the GPS-based initial position of the vehicle on the high definition map, and
determining an initial translational position of the camera by matching an object other than the traffic lane in a second region of interest with the captured image, the second region of interest larger than the first region of interest and including the first region of interest.

2. The vehicle position estimation method of claim 1, wherein the determining of the estimated position of the vehicle comprises:
determining an estimated position of the camera based on a matching error between the image and the plurality of the second landmarks in the high definition map corresponding to each of the plurality of the candidate positions sampled based on the GPS-based initial position of the camera and driving information on the vehicle; and
determining the estimated position of the vehicle based on the estimated position of the camera.

3. The vehicle position estimation method of claim 2, wherein the determining of the estimated position of the camera comprises:
assigning a weight to each of the plurality of the candidate positions based on the matching error between the captured image and the plurality of the second landmarks in the high definition map corresponding to each of the plurality of the candidate positions;
updating the plurality of the candidate positions based on the plurality of the weight-assigned candidate positions; and
determining, as the estimated position of the camera, an average value of the plurality of the updated candidate positions, when a standard deviation of the plurality of the updated candidate positions are equal to or less than a reference standard deviation.

4. The vehicle position estimation method of claim 3, wherein the determining of the estimated position of the camera further comprises:
determining the estimated position of the camera based on the matching error between the captured image and the plurality of the second landmarks in the high definition map corresponding to each of the plurality of the updated candidate positions, when the standard deviation of the plurality of the updated candidate positions is greater than the reference standard deviation.

5. The vehicle position estimation method of claim 2, wherein the determining of the estimated position of the vehicle comprises:
verifying the estimated position of the camera based on the matching error between the captured image and the first landmarks in the high definition map corresponding to the estimated position of the camera; and
determining the estimated position of the vehicle from the estimated position of the camera, when the estimated position of the camera is determined as valid according to the verification.

6. The vehicle position estimation method of claim 5, wherein the verifying the estimated position of the camera comprises:
determining weights of the estimated positions of the camera corresponding to each of the second landmarks; and
determining the estimated position of the camera as valid if the number of weights, among the obtained weights, that is equal to or greater than a reference value is equal to or greater than a reference number.

7. The vehicle position estimation method of claim 5, wherein the verifying the estimated position of the camera comprises verifying the estimated position of the camera based on the matching error between the second landmarks and the image in every frame.

8. The vehicle position estimation method of claim 5, further comprising:
obtaining a new estimated position of the camera if the estimated position of the camera is determined as invalid according to the verification.

9. The vehicle position estimation method of claim 1, wherein the first region of interest is an area within a first radius from a vehicle according to the GPS-based initial position of the vehicle.

10. The vehicle position estimation method of claim 1, wherein the first region of interest is an area within a first radius from the vehicle according to the GPS-based initial position of the vehicle, and wherein the second region of interest is an area within a second radius from the vehicle according to the GPS-based initial position of the vehicle.

11. A non-transitory computer-readable recording medium including computer executable instructions, wherein the instructions, when executed by a processor, cause the processor to perform a vehicle position estimation method, the method comprising:
obtaining a GPS-based initial position of a vehicle from a satellite signal;
determining landmark-based initial position of a camera mounted on the vehicle by matching a plurality of first landmarks in a high definition map with an image captured by the camera responsive to obtaining the GPS-based initial position of the vehicle; and
determining estimated position of the vehicle by comparing the image with a plurality of second landmarks in the high definition map, each of the plurality of the second landmarks corresponding to each of a plurality of candidate positions of the camera sampled based on the landmark-based initial position of the camera, and
wherein determining the landmark-based initial position comprises:
determining an initial attitude angle of the landmark-based initial position of the camera different from an attitude angle of the vehicle by matching a coordinate of a traffic lane selected from the first landmarks in a first region of interest of the high definition map with the captured image, the first region of interest determined by the GPS-based initial position of the vehicle on the high definition map, and
determining an initial translational position of the landmark-based initial position of the camera by matching an object other than the traffic lane in a second region of interest with the captured image, the second region of interest larger than the first region of interest and including the first region of interest.

12. The non-transitory computer-readable recording medium of claim 11, wherein the determining of the estimated position of the vehicle comprises:
determining an estimated position of the camera based on a matching error between the image and the plurality of the second landmarks in the high definition map corresponding to each of the plurality of the candidate positions sampled based on the GPS-based initial position of the camera and driving information on the vehicle; and
determining the estimated position of the vehicle based on the estimated position of the camera.

13. The non-transitory computer-readable recording medium of claim 12, wherein the determining of the estimated position of the camera comprises:
assigning a weight to each of the plurality of the candidate positions based on the matching error between the captured image and the plurality of the second landmarks in the high definition map corresponding to each of the plurality of the candidate positions;
updating the plurality of the candidate positions based on the plurality of the weight-assigned candidate positions; and
determining, as the estimated position of the camera, an average value of the plurality of the updated candidate positions, when a standard deviation of the plurality of the updated candidate positions are equal to or less than a reference standard deviation.

14. The non-transitory computer-readable recording medium of claim 12, wherein the determining of the estimated position of the vehicle comprises:
verifying the estimated position of the camera based on the matching error between the captured image and the first landmarks in the high definition map corresponding to the estimated position of the camera; and
determining the estimated position of the vehicle from the estimated position of the camera, when the estimated position of the camera is determined as valid according to the verification.

15. The non-transitory computer-readable recording medium of claim 14, wherein the verifying of the estimated position of the camera comprises:
determining weights of the estimated positions of the camera corresponding to each of the second landmarks; and
determining the estimated position of the camera as valid if the number of weights, among the obtained weights, that is equal to or greater than a reference value is equal to or greater than a reference number.

16. A vehicle position estimation device comprising:
a processor; and
memory coupled to the processor, the memory storing instructions when executed by the processor cause the processor to:
obtain a GPS-based initial position of a vehicle from a satellite signal;
determine landmark-based initial position of a camera mounted on the vehicle by matching a plurality of first landmarks in a high definition map with an image captured by the camera responsive to obtaining the GPS-based initial position of the vehicle; and
determine estimated position of the vehicle by comparing the image with a plurality of second landmarks in the high definition map, each of the plurality of the second landmarks corresponding to each of a plurality of candidate positions of the camera sampled based on the landmark-based initial position of the camera,
wherein the instructions to determine the landmark-based initial position comprising instructions to:
determine an initial attitude angle of the landmark-based initial position of the camera different from an attitude angle of the vehicle by matching a coordinate of a traffic lane selected from the first landmarks in a first region of interest of the high definition map with the captured image, the first region of interest determined by the GPS-based initial position of the vehicle on the high definition map, and
determine an initial translational position of the landmark-based initial position of the camera by matching an object other than the traffic lane in a second region of interest with the captured image, the second region of interest larger than the first region of interest and including the first region of interest.

* * * * *